United States Patent

[11] 3,596,163

[72] Inventor Glenn R. Barrett
 Box 85, Edinburg, Ind. 46124
[21] Appl. No. 830,416
[22] Filed June 4, 1969
[45] Patented July 27, 1971

[54] AUTO PILOT FOR BOATS
 20 Claims, 7 Drawing Figs.
[52] U.S. Cl. .................................................. 318/588,
 318/489, 318/653, 114/144
[51] Int. Cl. .................................................. G05d 1/00,
 B63h 25/02
[50] Field of Search ........................................... 318/20.704,
 20.225, 489; 114/144 R

[56] References Cited
UNITED STATES PATENTS
2,415,819 2/1947 Halpert et al. ................ 318/653
3,280,781 10/1966 Koerner ...................... 318/588
3,493,829 2/1970 Cramwinckel ............... 318/653

Primary Examiner— Benjamin Dobeck
Attorney— Hood, Gust, Irish and Lundy

ABSTRACT: For use in controlling a bidirectional steering motor, an autopilot system comprising a rotatable, highly permeable bar and a pair of coils diametrically oppositely disposed about the path of rotation of the bar. The coils are connected in series and an amplifier is used operably to connect the coils to first and second switch means. The first switch means drives the steering motor in one direction and the second switch means drives the motor in the opposite direction. Negative pulses provided by the coils are amplified to operate the first switch means and positive pulses provided by the coils are amplified to operate the second switch means. The coils are mounted on a platform and, preferably, means is provided for driving the platform about the rotational axis of the bar to move the coils toward a position providing a null output.

PATENTED JUL 27 1971
3,596,163
SHEET 1 OF 4
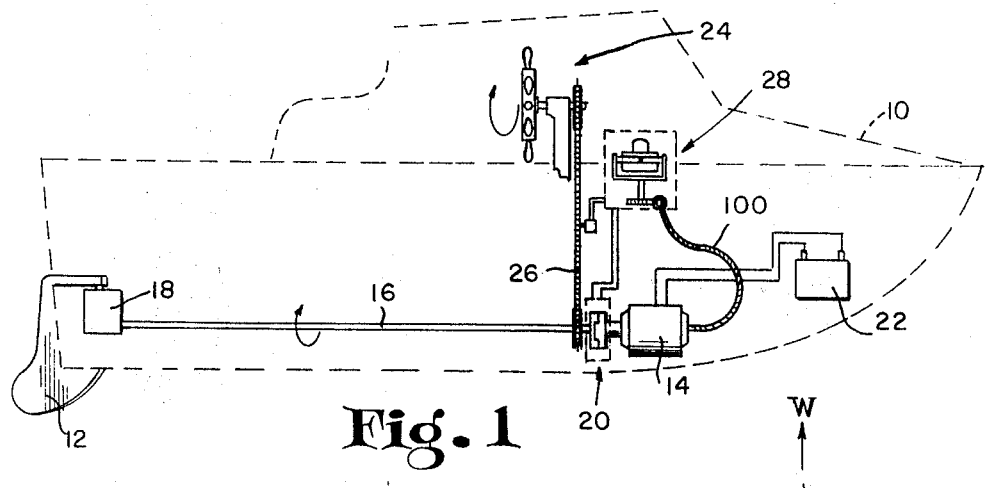
Fig. 1
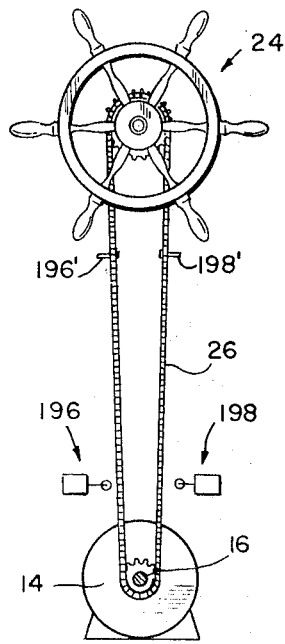
Fig. 2
Fig. 3
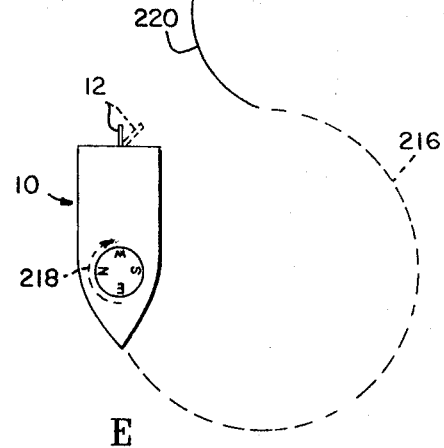
INVENTOR.
GLENN R. BARRETT
BY
Wood, Gust, Irish & Lundy
ATTORNEYS

INVENTOR.
GLENN R. BARRETT

AUTO PILOT FOR BOATS

It is a primary object of my invention to provide a relatively inexpensive but very effective autopilot system. My system is particularly suitable for use on small ships and boats, such as fishing craft which go out into the ocean out of sight of the shore or visual navigation aids. It will be appreciated, however, that my system may be used with any ship.

My system comprises a platform which is preferably gimbal mounted, coil means mounted on the platform, a bar mounted for rotation adjacent the coil means and means for rotating the bar, the bar being characterized by its high magnetic permeability and low magnetic retentivity. My system further includes first switch means for energizing a steering motor to drive it in one direction, second switch means for energizing the motor to drive it in the opposite direction, and circuit means for operatively connecting the coil means to the switch means. The circuit means is effective to operate the first switch means. The circuit means is effective to operate the first switch means to drive such a motor in the said one direction when the coil means provides output pulses of a first predetermined characteristic and to operate the second switch means to drive the motor in the said opposite direction when the coil means provides output pulses of a second and significantly different predetermined characteristic.

The rotatable bar of my system is generally horizontally extending and rotatable about a vertical axis and preferably the coil means includes a pair of coils connected in series and diametrically oppositely disposed about the periphery of the rotational path of the bar so as to provide an output which will operate one or the other of the switch means whenever the bar is rotated except when the coils are arranged along an imaginary line extending horizontally in a predetermined direction relative to the Earth's magnetic field. My preferred system is arranged so that negative pulses provide by the coils will operate the first switch means and positive pulses provided by the coils will operate the second switch means. In this preferred system, the coils will provide a null output or a zero output when the two coils are arranged along a line extending in the east-west direction.

My preferred system also includes means for driving the platform on which the coils are mounted about the rotational axis of the bar to move the coils toward the position providing a null output, i.e., an output which will not operate either the first switch means or the second switch means. This driving means is arranged to move the platform when either one of the switch means is operated to operate the steering motor. In some cases, as will be further described, I may drivingly connect the gimbal system on which the coils are mounted to the motor which drives the rudder of a boat. Thus, when the rudder motor is operated to change the course of the boat, the coils will be moved to a position providing a null output. Of course, the movement of the boat will likewise position the coils. The manner in which this feature is operable to steer the boat will be further explained hereinafter.

In this description and in the claims appended hereto, I have said that the coils will provide an output which will not operate the switch means which control the steering motor when the coils are arranged along an imaginary line extending in a predetermined direction relative to the Earth's magnetic field. This imaginary line is preferably a horizontally extending line disposed in a vertically extending plane. Thus, when the two coils are disposed in this plane, i.e., the center portion of each coil is disposed in the plane, and along the imaginary line, the output of the coils caused by the rotation of the bar therebetween is such that the switch means will not be operated to operate the steering motor. I have found that it is particularly convenient when this reference plane is a vertically extending, east-west reference plane and the rotational axis of the bar is vertically extending and lying in the reference plane. I have also found that it is convenient when the axis about which each coil is wound is perpendicular to the reference plane.

My autopilot system, therefore, is a magnetic field responsive device comprising a signal generator excited by the Earth's magnetic field. In my case, the generator comprises a rotatable bar of high magnetic permeability and low magnetic retentivity and a pair of coils disposed at diametrically opposite positions about the periphery of the rotational path of the bar. The current generated, in the coils, therefore, depends on their position relative to the Earth's magnetic field.

Other objects and features of my invention will become apparent as this description progresses.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is an elevational view of a steering system for a boat, the boat being shown in phantom;

FIG. 2 is an elevational view of the manual steering system for the boat;

FIG. 3 is a diagrammatical view showing how my autopilot system may be used to change the direction of the boat 180°;

Figure 4:
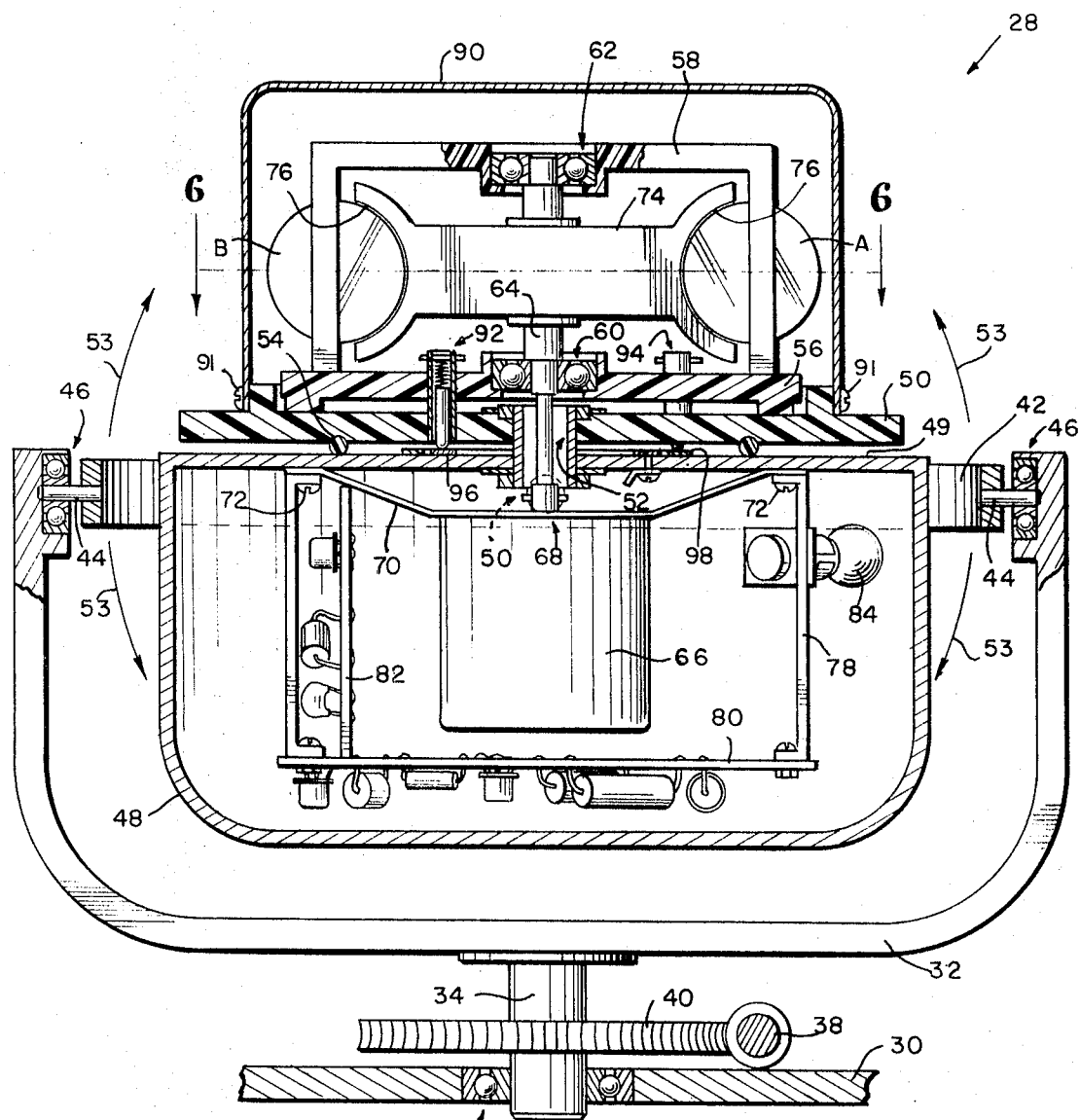
FIG. 4 is a sectional view of my autopilot system.

Referring particularly to FIG. 1, it will be seen that I have illustrated, in phantom, a boat 10 including a conventional rudder 12 which is operated by a rudder motor 14, the motor being connected to the rudder by means of a shaft 16, a driving connection means 18 between the shaft and the rudder, and a clutch 20 between the shaft and the motor. Conventionally, a battery 22 is used to drive the motor 14. Further, a conventional helm 24 is drivingly connected to the shaft 16 by means of a chain 26 as best seen in FIG. 2.

It is an object of my invention to provide an autopilot system, such as indicated at 28, for controlling the rudder motor 14.

Figure 6:
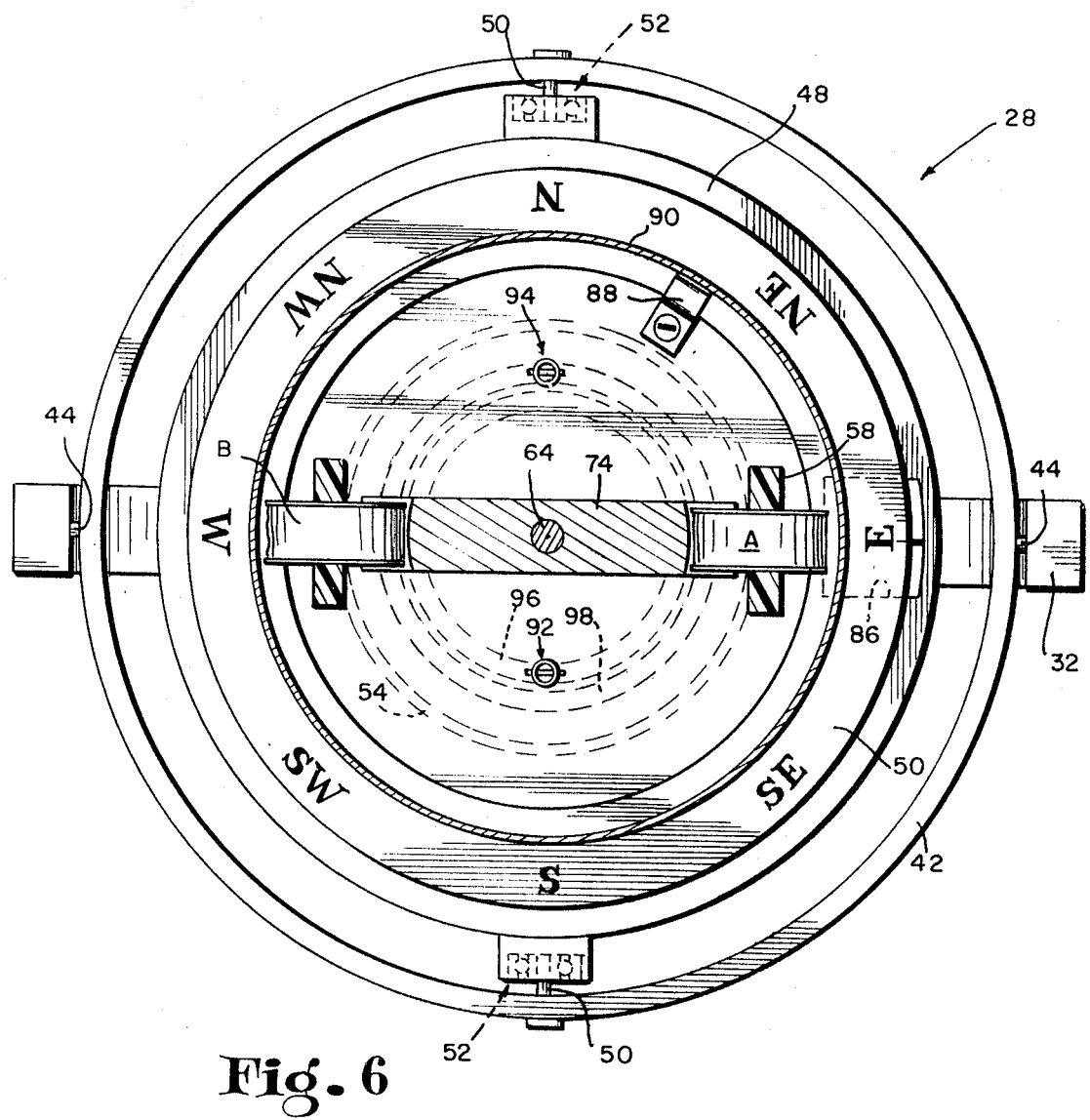
FIG. 6 is a sectional view taken from FIG. 4 generally along the line 6-6.
Figure 7:
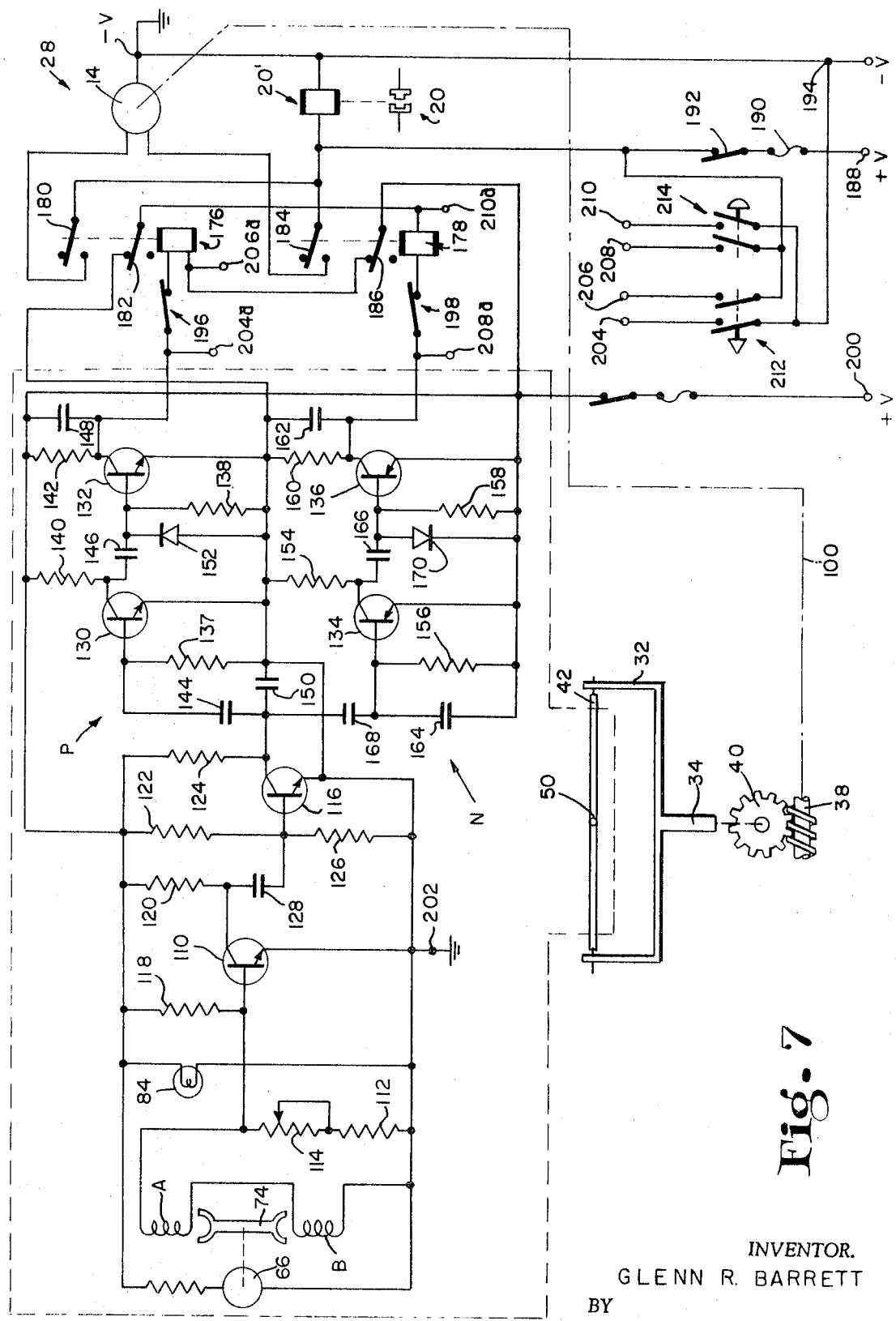
FIG. 7 is a schematic of my autopilot system.

Referring now to FIGS. 4, 6 and 7, my autopilot system 28 will be discussed. In the sectional view of FIG. 4, I show a fragmentary portion of a casing or housing 30 on which or in which my system 28 is disposed. The system 28 includes an outer gimbal 32 which is journal mounted for rotation relative to the casing 30. In the illustrative embodiment, the gimbal 32 is mounted on a stub shaft 34 which is journal mounted by means of a bearing 36 in the wall representing the casing 30. Also, in FIG. 4, I show a worm 38 and a worm gear 40 in meshing engagement, the worm gear 40 being mounted on the stub shaft 34 for rotation therewith.

An intermediate or middle gimbal 42, which may be circular in shape as shown in FIG. 6, is mounted for oscillation on the gimbal 32. Conventionally and preferably, the gimbal 42 is mounted on the gimbal 32 for rocking movement about the axis which is perpendicular to and intersecting the axis defined by the stub shaft 34. In the illustrative embodiment, the gimbal 32 is a yoke-type gimbal and the gimbal 42 is rockably supported on diametrically oppositely extending stub shafts 44, each of which is journal mounted by a bearing 46 carried on the gimbal 32.

An inner gimbal or platform 48 is mounted within the gimbal 42 for rocking movement about an axis which, conventionally and preferably, is perpendicular to and intersecting the axis defined by the stub shafts 44. In the illustrative embodiment, this inner gimbal or platform 48 is journal mounted on a pair of diametrically disposed, inwardly extending trunnions 50 carried by the middle gimbal 42, the platform 48 carrying bearings 52 (FIG. 6) mounted, respectively, on these trunnions. The platform 48, therefore, can rock as indicated by the arrows 53 (FIG. 4) about the axis defined by the trunnions 50 while the middle gimbal 42 which carries the trunnions 50 can rock about the axis defined by the stub shafts 44.

It will be appreciated by those familiar with gimbal systems or guidance systems that the gimbal arrangement discussed above is such that the platform 48 may be considered a stable reference platform. That is, because of the weight of the platform 48 and the items mounted thereon, it will tend to remain level with respect to the Earth's surface. It will also be appreciated by those familiar with gimbal systems that I may conventionally apply damping devices to prevent random oscillation of the gimbal 42 relative to the gimbal 32 and of the platform 48 relative to the gimbal 42. Such damping devices, not shown in the drawings, may be conventional dash pots, springs, etc.

For purposes of simplifying this description, I show the platform 48 with a flat, upwardly facing reference surface 49 which, because of the manner in which the platform 48 is gimbal mounted, will always be substantially horizontal.

Mounted above the surface 49 is a second platform 50 which, in the illustrative and preferred embodiment, is fabricated from a clear plastic material and which is disposed parallel to the upper surface 49. This second platform 50 is mounted for rotation on the platform 48 by means such as the illustrative bushing 52. I show a rubber ring 54 concentrically disposed between the platform 50 and the upper surface 49 to act as means for frictionally resisting movement of the platform 50 relative to the surface 49. The bushing 52 is hollow as seen in FIG. 4.

I prefer to provide a mounting structure including a plate 56 and a bracket 58, both of which preferably are plastic, mounted on the platform 50. These members 56, 58, respectively, carry roller bearings 60, 62 which journal mount a shaft 64 which extends concentrically through the bushing 52 and which is drivingly connected to a motor 66. The driving connection between the motor 66 and the shaft 64 is indicated at 68. The motor 66 is supported below the upper surface 49 by means of a bracket 70 mounted on the platform 48 by means of screws 72.

In the space defined by the member 56, 58 I have mounted a ferrite bar 74 on the shaft 64 for rotation therewith. Thus, this bar 74 is driven, preferably but not necessarily, at a constant speed by the motor 66. This ferrite bar 74 is characterized by its high magnetic permeability, low magnetic retentivity or coercive force, and practically no hysteresis. The ends of the bar 74 are formed with cylindrical concavities as indicated at 76 and a pair of cylindrically shaped coils A, B are mounted on the bracket 58 as illustrated in FIGS. 4 and 6 to extend into these concavities or, more specifically, into the path defined by rotation of these cavities about the axis of the shaft 64. The function of the coils A and B and the bar 74 will be explained as this description progresses.

In the illustrative embodiment, I have arranged most of the circuitry associated with my autopilot system 28 within the confines of the inner gimbal 48 which, as illustrated, is preferably a containerlike gimbal. Thus, I show circuit boards 78, 80, 82 mounted within this gimbal 48. I also show a light 84 disposed within the gimbal 48 and below an opening 86 (FIG. 6) in the upper plate providing the upper surface 49. It will be appreciated that this light 84 projects through the opening 86 and the clear plastic platform 50 which, as shown in FIG. 6, is provided with directional markings. The adjusted position of the platform 50, therefore, will be readily visible. Since the coils A, B are fixed in position relative to the platform 50, the adjusted position of these coils can be seen by means of the light 84 and the opening 86.

I show a ground strap 88 for a domelike cover 90 which is mounted on the platform 50 by means, such as the screws 91. This cover 90, which is preferably stainless steel, completely encloses the structure above the platform 50.

I show conventional spring loaded contacts 92, 94 carried on the platform 50 and arranged to connect the coils A, B to the circuitry within the gimbal 48. These contacts 92, 94 engage, respectively, circular contact strips 96, 98 disposed concentrically about the axis of the bushing 52.

The worm 38 which is in meshing engagement with the worm gear 40 on the stub shaft 34 is drivingly connected to the rudder motor 14 by means of a flexible drive cable 100. It will be appreciated that this method of drivingly connecting the gimbal 32 to the rudder motor 14 is merely illustrative and that other such transmission means may be used.

Operation of the rudder motor 14 to move the rudder 12, therefore, drives the gimbal 32 about the axis of the shaft 34. The reason for this feature of my invention will become apparent as this description progresses.

Referring now to FIG. 7, the circuitry of my autopilot system 28 will be discussed. In FIG. 7, at the left-hand side thereof, I show my coils A, B and the ferrite bar 74 which is driven by the motor 66. It will be seen that the coils A, B are connected in series, one side of the series circuit being connected to ground and the other side being connected to the base electrode of an NPN transistor 110 and through a resistor 112 and a potentiometer 114 to ground. The signals generated in the coils A, B are applied, therefore, to the base electrode of the transistor 110. A positive signal applied to the base electrode of the transistor 110 will cause the transistor to provide, at its collector electrode, a negative signal which will, in turn, apply a negative signal to the base electrode of another NPN transistor 116 to cause that transistor to provide a positive signal at its collector electrode. Conversely, a negative signal applied to the base electrode of the transistor 110 will cause the transistor 116 to provide a negative output signal at its collector electrode. These transistors 110, 116 serve, therefore, to amplify the signals generated in the coils A, B. I show resistors 118, 120, 122, 124, 126 and a capacitor 128 conventionally associated with the amplifying transistors 110, 116. The following table of component values is presented for a better understanding of my system 28:

Coils A, B – 275 ohms each
Transistors 110, 116 – GE8, NPN
Resistor 112 – 3,000 ohms
Potentiometer 114 – 7,000 ohms
Resistor 118 – 150,000 ohms
Resistor 120 – 18,000 ohms
Resistor 122 – 220,000 ohms
Resistor 124 – 10,000 ohms
Resistor 126 – 3,000 ohms
Capacitor – 10 microfarads It will be appreciated that the circuitry connected to the output of the transistor 116 is a two-channel amplifier means, one channel P for amplifying positive signals and the other channel N for amplifying negative signals. Specifically, in my illustrative system 28, one channel P amplifies signals requiring a left-hand turn and the other channel N amplifies signals requiring a right-hand turn. In my system, negative pulses are amplified to cause the rudder motor 14 to make a right-hand turn and positive pulses are amplified to cause the motor to operate to make left-hand turns.

Positive pulses, therefore, are amplified by the channel P comprising NPN transistors 130, 132, and, conversely, negative pulses are amplified by the channel N comprising PNP transistors 134, 136.

The P channel includes the following components conventionally arranged and connected to transistors 130, 132:

Resistor 137 – 3,000 ohms
Resistor 138 – 10,000 ohms
Resistor 140 – 4,700 ohms
Resistor 142 – 1,500 ohms
Capacitor 144 – 3 microfarads
Capacitor 146 – 10 microfarads
Capacitor 148 – 10 microfarads
Capacitor 150 – 0.1 microfarad
Diode 152

The N channel includes the following conventionally arranged components connected to the transistors 134, 136:

Resistor 154 – 4,700 ohms
Resistor 156 – 2,200 ohms
Resistor 158 – 10,000 ohms
Resistor 160 – 1,500 ohms
Capacitor 162 – 10 microfarads Capacitor 164 – 0.1 microfarad
Capacitor 166 – 10 microfarads
Capacitor 168 – 3 microfarads
Diode 170

It will be appreciated that the above listed components for channels P, N are illustrative and that such component values are determined primarily by the characteristics of the transistors 130, 132 and 134, 136 in each channel as well as the desired output for each channel.

Preferably, the motor 14 is a double wound, direct current, reversible motor. I show relays 176, 178, respectively, connecting the P channel and N channel to the motor 14. The relay 176 includes contact members 180, 182 and the relay 178 includes contact members 184, 186. When the relay 176 is energized by current flow from the P channel, the motor 14 is driven to make a left-hand turn by current flow from a positive voltage terminal 188, through a fuse 190, a power switch 192, the contact member 180 and one field coil of the motor 14 to the negative voltage terminal 194 which is connected to ground as illustrated. When the relay 178 is energized by current flow from the N channel, the motor 14 is driven to make a right-hand turn by current flow from the terminal 188, through the fuse 190, power switch 192, contact member 184 and the opposite field coil of the motor 14 to the terminal 194.

When the switch 192 is closed, current flows through the coil of a solenoid 20' which operates the clutch 20 drivingly to connect the motor 14 to the shaft 16. It will be appreciated that this clutch may also be manually or hydraulically operated to connect the motor 14 to the shaft 16.

The relay 176 is energized through a limit switch 196 connected between the P channel and the relay 176 and the relay 178 is energized through a limit switch 198 connected between the N channel and the relay 178. The function of these limit switches 196, 198 is to deenergize the motor 14 after the rudder 12 has been turned to a predetermined position away from its normal position. These limit switches 196, 198 may be placed in any position so that they will be operated after the rudder has moved such a predetermined amount. It is convenient, as shown in FIG. 2, to place actuators 196', 198' on the chain 26 which drivingly connects the helm 24 to the shaft 16, these actuators being associated, respectively, with the correspondingly numbered limit switch 196, 198.

The power for the amplifier circuitry of the system 28 is applied across the terminals 200, 202 as illustrated. This power source may be separate and distinct from the power source supplied across terminals 188, 194.

Referring still to FIG. 7, it will be seen that I have shown connection points 204, 206 which may be connected, respectively, to connection points 204a, 206a on opposite sides of the field coil of relay 176. I have also shown connection points 208, 210 which may be connected, respectively, to connection points 280a, 210a on opposite sides of the field coil of relay 178. I then show manually operated switch means 212 arranged, when closed, to energize relay 176 and other manually operated switch means 214 arranged, when closed, to energize relay 178. These switch means 212, 214, are, therefore, remote control switches for operating the motor 14 to steer the boat 10.

The potentiometer 114 provides a means for controlling the sensitivity of the system 28. This potentiometer 114 controls the bias level on the transistor 110.

At this point, I emphasize again that, in the illustrative and preferred embodiment, the rudder motor 14 is drivingly connected to the outer gimbal 32 so that operation of the rudder motor moves the outer gimbal and, therefore, the position of the coils A, B relative to the boat 10 on which the system 28 is mounted. Assuming that the boat 10 is heading, for instance, due east and that, for some reason, the boat is caused to be headed slightly northeast, this shifting of the boat will cause the coils A, B to provide negative pulses which are amplified through the N channel to operate the motor 14 to provide a right-hand turn. When the motor 14 is so energized, it drives the gimbal 32 to move the coils A, B clockwise so that the coils will again be lying in a plane which is a vertically extending east-west reference plane. This results in the rudder 12 itself being left at an angle which will continue to turn the boat 10 to the right so that, after the boat turns to the point where the coils A, B move clockwise through such an east-west reference plane, the coils will then produce positive pulses which are amplified by the P channel to drive the motor 14 to begin to turn the boat 10 back to the left. This process is, therefore, one of correcting and over correcting until the rudder motor 14 drives the rudder 12 to the point where the boat 10 is headed always in the selected direction.

In my preferred system, the coils A, B provide a null output or a zero output only when the coils lie in a vertically extending east-west reference plane. When the coils A, B move counterclockwise out of such a plane, they provide negative output pulses and when the coils move clockwise out of such a plane, they provide positive output pulses. Thus, the rudder motor 14 will be energized to turn the boat either to the left or to the right depending upon the direction of movement of the coils A, B out of the east-west reference plane.

Assume, for purposes of this description, that coil A is the east coil and that the coil B is the west coil, i.e., assume that the system 28 is arranged so that the coils A, B will provide a zero output when the coils lie in the east-west reference plane with the coil A to the east of the coil B. These coils A, B are movable with the platform 50 relative to the gimbals 32, 42, 48. As best seen in FIG. 6, the upper surface of this circular platform 50 serves as a dial with directional markings. The coil A is directly adjacent to the marking "E" for east and the coil B is directly adjacent to the marking "W" for west. Assume further that the above-referred to east-west reference plane is a vertical plane which includes the vertically extending axis of the shaft 64 which defines the axis of rotation for the ferrite bar 74. Then, when the boat 10 is not turning, its pilot can assume that the coils A, B are lying in the east-west reference plane and, by looking at the dial markings (FIG. 6) to see which part of the platform 50 is illuminated through the window 86, can determine the direction in which the boat is heading.

My system 28 is arranged so that when the rudder motor 14 is energized, it will continue to turn until it is deenergized either by deenergization of the relay 176, 178 through which it is energized, or by opening of the limit switch 196, 198 associated with the relay. Each limit switch 196, 198 represents a full rudder condition, switch 196 representing a full turn to the left and switch 198 representing a full turn to the right. Once the motor 14 drives the rudder 12 until a limit switch 196, 198 is opened, the rudder will stay in the full rudder condition until the motor is energized to drive the rudder back. That is, the system 28 is arranged so that, if a negative pulse is amplified to drive the motor 14 to move the rudder 12 to its full rudder condition providing a right-hand turn, the rud 'er will stay in this condition until a positive pulse is provided by the coils A, B and amplified to drive the motor 14 in the opposite direction. Such a condition may exist, for instance, when the operator of the boat 10 rapidly turns the platform 50 to select a new heading. Generally, the limit switches 196, 198 will not be operated by correction pulses provided by the coils A, B. That is, once a heading is selected and the auto pilot system 28 takes over, generally the coils A, B will only provide pulses representing minor variations in either direction from the selected heading.

Once the platform 50 is rotated to select a new heading, the boat 10 will turn until the coils A, B are again lying in the east-west reference plane regardless of the direction in which the boat is travelling. That is, for instance, even if the boat 10 is headed northeast, the platform 50 must be located so that the coils A, B are in the east-west reference plane to provide a zero output.

By driving the gimbal 32 to move the coils A, B back toward the east-west reference plane while the rudder 12 is being moved, I have substantially eliminated the seeking characteristics which are prevalent without such a feature. If I change the direction of the platform 50 to select a new heading, the motor 14 is energized to drive the rudder 12 and, at the same time, to drive the gimbal 32 immediately to turn the coils A, B toward the east-west reference plane. The coils A, B then null out or provide a zero output upon entering the reference plane to shut off the rudder motor 14 to leave the rudder 12 off at an angle. The boat, therefore, continues to turn and will continue to turn until the coils A, B move through the reference plane, at which time the motor 14 is driven in the opposite direction to correct the position of the rudder 12.

My system 28, therefore, can be used to select a course for a boat an to keep the boat on the selected course. This system 28 includes a magnetic detector or a means for providing output signals representing the position of the system relative to the Earth's magnetic field. The heart of my system is the rotating bar 74 and the coils A, B. The bar 74 is rotated at, for instance, 2,000 r.p.m. about a vertical axis which is the axis of the shaft 64. As the bar 74 rotates, it becomes magnetized by the Earth's magnetic field. When the bar is extending in a north-south direction, the north end of the bar is magnetized to provide an N pole and the south end of the bar is magnetized to provide an S pole. As the bar 74 rotates toward an east-west direction, the magnetism in the bar fades substantially to zero when the bar is extending east and west. As the bar 74 continues to rotate, the end that was magnetized as an N pole, becomes magnetized to be an S pole while the opposite end, which was an S pole, becomes an N pole. Maximum magnetization of the bar 74 is obtained when the bar is extending due north and south and minimum magnetization is obtained when the bar is extending due east and west. Thus, as the bar rotates, the end of the bar to the north of the east-west reference plane is always an N pole and the end to the south of this plane is always an S pole.

A voltage is generated in each coil A, B to indicate whether the coil is being passed by an N pole or an S pole, provided the coils are not lying in the east-west reference plane. When the coils A, B are in such a reference plane, the ends of the bar 74 are not magnetized as the bar moves through the plane and, therefore, no voltage is generated in the coils.

That is, referring to FIG. 6, my system is arranged so that the coil A will provide negative pulses when it is rotated counterclockwise about the axis of the shaft 64 and positive pulses when it is rotated clockwise about the axis. I prefer to use the two coils A, B connected in series in such a manner as to double the output of the sensing portion or detecting portion of my system 28.

Regardless of the direction in which the boat 10 is moving, a shift of the boat to the left will turn the coil A to the north and the coil B to the south to generate negative pulses which are amplified to cause the boat to steer to the right. If the boat 10 is shifted to the right, the coil A will turn to the south and the coil B will turn to the north to provide positive pulses which are amplified to cause the boat to be steered to the left.

My system 28 is arranged so that the pilot of the boat can be sure of his heading in the proper direction and can be assured that he is not heading 180° in the opposite direction. That is, if, while the power is off, the platform 50 is rotated 180° to reverse the positions of the coils A, B in the east-west reference plane and the power is turned on, the coils will provide a zero or null output and the motor 14 will not be operated. Once correction is required, however, the boat 10 will turn in a circle the first time the motor 14 is energized by the system 28 and the boat will continue to turn until the coils A, B are again in the east-west reference plane with the coil A to the east of the coil B. This situation is illustrated diagrammatically in FIG. 3. Referring to FIG. 3, and assuming that the boat is heading due east and that the pilot desires to be heading due west and believes he is heading due west, then, as soon as the first correction is made by the system 28, the rudder 12 will be driven to the full rudder position to drive the boat 10 until the coils A, B are again properly aligned in the east-west reference plane. Since the boat must make a 180° turn, the first initial turning of the rudder will provide movement of the boat as indicated by the broken line 216. As discussed previously, since the gimbal 32 is driven in the direction opposite to that which the boat 10 is being turned as indicated by the broken line arrow 218, when the boat is turned to the point where the coils A, B are properly aligned in their east-west reference plane, the rudder 12 will be left at an angle which will continue to turn the boat to move the coils out of the plane in the opposite direction. Thus, after the boat 10 has turned through the path indicated by the broken line 216, the rudder 12 will be turned in the opposite direction to move through the path indicated by the solid line 220. This is the correction and overcorrection referred to previously. The boat 10, therefore, after the initial large turn indicated by the broken line 216, zigzags until it is heading in the desired direction.

Figure 5:
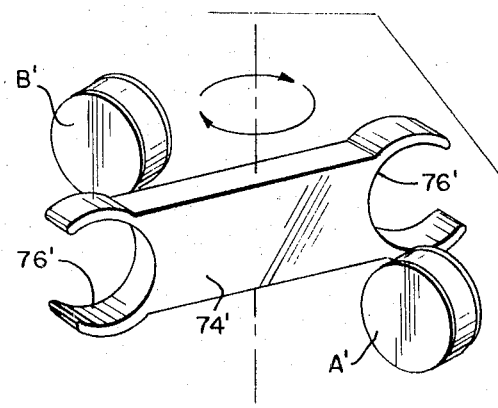
FIG. 5 is a perspective view of an alternate form of rotatable ferrite bar for my autopilot system.

Referring to FIG. 5, it will be seen that I have shown an alternate form of the bar 74. The bar 74' of FIG. 5 is formed at its ends as indicated at 76' with cylindrical concavities, the inner peripheries of which extend about approximately two-thirds of the outer periphery of the coils A', B'. In this manner, I am able to generate pulses of greater amplitudes in the coils A', B'.

While the gimbal 32 is shown drivingly connected to the motor 14 by means of the cable 100, worm 38 and worm gear 40, it will be appreciated that a bidirectional electric motor may be drivingly connected to the gimbal 32 and that this motor can be controlled, for instance, by the relays 176, 178 to accomplish the desired function. Such a motor and the illustrated means including cable 100, worm 38 and worm gear 40 comprise means for driving the coils A and B to a position providing a null output when the coils are moved out of their east-west reference plane to provide either positive or negative pulses.

While the steering motor 14 is shown in a bidirectional electric motor, it will be appreciated that, for instance, bidirectional fluid motor means may be used to move a steering element, such as the rudder 12.

What I claim is:

1. For use in controlling a bidirectional steering motor, an autopilot system comprising a platform, coil means mounted on said platform, a bar mounted for rotation adjacent said coil means and power drive means for rotating said bar, said bar being characterized by its high magnetic permeability and low magnetic retentivity, first switch means for energizing such a motor to drive it in one direction and second switch means for energizing such a motor to drive it in the opposite direction, and circuit means for operatively connecting said coil means to said switch means, said circuit means being effective to operate said first switch means to drive such a motor in said one direction when said coil means provides output pulses of a first predetermined characteristic and to operate said second switch means to drive such a motor in said opposite direction when said coil means provides output pulses of a second and significantly different predetermined characteristic.

2. The system of claim 1 in which said bar is generally horizontally extending and rotatable about a generally vertically extending axis intermediate its ends, and in which said coil means includes a pair of coils connected in series and diametrically oppositely disposed about the periphery of the rotational path of said bar so as to provide an output which will not operate said switch means only when said coils are arranged along an imaginary line extending in a predetermined direction relative to the Earth's magnetic field.

3. The system of claim 1 in which said bar is generally horizontally extending and rotatable about a generally vertically extending axis intermediate its ends, and in which said coil means includes a pair of coils connected in series and diametrically oppositely disposed about the periphery of the rotational path of said bar so as to provide output pulses of said first predetermined characteristic when said coils are moved in one direction about the rotational axis of said bar away from a line extending in a predetermine direction relative to the Earth's magnetic field and output pulses of said second predetermined characteristic when said coils are moved in the opposite direction about said axis away from said line and to provide an output which will not operate said switch means when said coils are arranged along said line.

4. The system of claim 1 in which said bar is generally horizontally extending and rotatable about a generally vertically extending axis intermediate its ends, and in which said coil means includes a pair of coils connected in series and diametrically oppositely disposed about the periphery of the rotational path of said bar so as to provide an output which will so operate one or the other of said switch means whenever said bar is so driven except when said coils are arranged along an imaginary line extending horizontally in a predetermined direction relative to the Earth's magnetic field.

5. The system of claim 1 including means for driving said platform to move said coil means toward a position relative to the Earth's magnetic field, in which position said coil means will not provide output pulses effective to operate either of said switch means, said driving means being arranged to move said platform when said switch means are operated to operate such a motor.

6. The system of claim 4 including means for driving said platform about the rotational axis of said bar to move said coils toward a position arranged along said imaginary line, said driving means being arranged to move said platform when said switch means are operated to operate such a motor.

7. For use in controlling a bidirectional steering motor, an autopilot system comprising a platform, coil means mounted on said platform, a bar mounted for rotation adjacent said coil means, and power drive means for continuously rotating said bar, said bar being characterized by its high magnetic permeability and low magnetic retentivity, first switch means for energizing such a motor to drive it in one direction and second switch means for energizing such a motor to drive it in the opposite direction, and amplifier means for operatively connecting said coil means to said switch means, said amplifier means being effective to operate said first switch means to drive such a motor in said one direction when said coil means provides negative output pulses and to operate said second switch means to drive such a motor in said opposite direction when said coil means provides positive output pulses.

8. The system of claim 7 including means for driving said platform to move said coil means toward a position providing a null output, said driving means being arranged to move said platform when said switch means are operated to operate such a motor.

9. The system of claim 8 in which said driving means is arranged to drive said platform about a vertical axis in one direction when said coil means provides negative pulses and in the opposite direction when said coil means provides positive pulses.

10. The system of claim 7 including means for driving said platform to move said coil means toward a position providing a null output, said driving means including transmission means arranged drivingly to connect said platform to such a steering motor.

11. The system of claim 10 in which said transmission means includes a flexible drive cable adapted to connect such a motor to said platform.

12. The system of claim 11 in which said transmission means further includes a worm gear mounted on said platform and a worm in meshing engagement with said worm gear, said worm gear being connected to said cable for rotation therewith.

13. The system of claim 7 in which said coil means includes a pair of coils connected in series, said coils being diametrically oppositely disposed about the periphery of the rotational path of said bar so as to provide a null output which will not operate said switch means only when said coils are arranged along an imaginary line extending in an east-west direction.

14. The system of claim 7 in which said bar is generally horizontally extending and rotatable about a generally vertically extending axis intermediate its ends, and in which said coil means includes a pair of coils connected in series and diametrically oppositely disposed about the periphery of the rotational path of said bar so as to provide a null output which will not operate said switch means only when said coils are arranged along a line extending in an east-west direction.

15. The system of claim 14 in which each of said coils is wound about a generally horizontally extending axis, the axes of said coils being generally parallel.

16. The system of claim 15 in which each end of said bar is provided with a cylindrically concave cutout formed about a generally horizontal axis, the diameter of each cutout being just slightly greater than the outer diameter of each of said coils, and the rotational axis of said bar extending through its center, and in which said coils are spaced relative to said bar so that each cutout, as it moves past each of said coils, peripherally extends about a portion of said coil.

17. The system of claim 8 in which said coil means includes a pair of coils connected in series, said coils being diametrically oppositely disposed about the periphery of the rotational path of said bar so as to provide a null output which will not operate said switch means only when said coils are arranged along an imaginary line extending in an east-west direction.

18. The system of claim 9 in which said bar is generally horizontally extending and rotatable about a generally vertically extending axis intermediate its ends, and in which said coil means includes a pair of coils connected in series and diametrically oppositely disposed about the periphery of the rotational path of said bar so as to provide a null output which will not operate said switch means only when said coils are arranged along a line extending in an east-west direction.

19. The system of claim 9 in which said bar is generally horizontally extending and rotatable about a generally vertically extending axis intermediate its ends, the rotational axis of said bar coinciding with the axis about which said platform is driven and in which said coil means includes a pair of coils diametrically oppositely disposed about the periphery of the rotational path of said bar so as to provide a null output which will not operate said switch means only when said coils are arranged along an imaginary line extending in an east-west direction.

20. The system of claim 19 in which said coil means is mounted for selectively adjustable movement about the rotational axis of said bar.

PO-1050
(5/69)

UNITED STATES PATENT OFFICE
CERTIFICATE OF CORRECTION

Patent No. 3,596,163                                Dated July 27, 1971

Inventor(s)    Glenn R. Barrett

It is certified that error appears in the above-identified patent and that said Letters Patent are hereby corrected as shown below:

Column 1, line 17, cancel "The circuit means is effective to operate the first switch"; same column, line 18, cancel "means." (first occurrence); same column, line 36, "provide" should be -- provided --.
Column 2, line 59, "the" (last occurrence) should be -- an --.
Column 5, line 53, "280a," should be -- 208a, --.
Column 7, line 13, "an" should be -- and --.
Column 8, line 36, "in" should be -- as --; same column, line 43, (Claim 1, line 4) after "for" insert -- continuously --.
Column 10, line 5, (Claim 12, line 4) cancel "gear", so that the line reads -- worm being connected to said cable for rotation --.

Signed and sealed this 22nd day of February 1972.

(SEAL)
Attest:

EDWARD M. FLETCHER, JR.                ROBERT GOTTSCHALK
Attesting Officer                       Commissioner of Patents